United States Patent [19]
Venkatesh

[11] Patent Number: 5,778,216
[45] Date of Patent: Jul. 7, 1998

[54] METHOD FOR HIERARCHICAL TIME DRIVE CIRCUIT LAYOUT BY REBUDGETING TIMING CONSTRAINTS OF PLURALITY OF LOGICAL BLOCKS AFTER PLACEMENT

[75] Inventor: S. V. Venkatesh, San Jose, Calif.

[73] Assignee: Cadence Design Systems, Inc., San Jose, Calif.

[21] Appl. No.: 497,699

[22] Filed: Jun. 30, 1995

[51] Int. Cl.$^6$ .................................................. G06F 15/00
[52] U.S. Cl. .................... 395/558; 395/555; 364/488; 364/489; 364/491; 364/578
[58] Field of Search ........................ 395/921, 919, 395/500, 550, 600, 558, 555; 364/488, 489, 490, 491, 578

[56] References Cited

U.S. PATENT DOCUMENTS

| | | | |
|---|---|---|---|
| 4,612,618 | 9/1986 | Pryor et al. | 364/490 |
| 5,111,413 | 5/1992 | Lanzansky et al. | 364/578 |
| 5,218,551 | 6/1993 | Agrawal et al. | 364/491 |
| 5,237,514 | 8/1993 | Curtin | 364/490 |
| 5,426,591 | 6/1995 | Ginetti et al. | 364/489 |
| 5,461,576 | 10/1995 | Tsay et al. | 364/490 |
| 5,475,607 | 12/1995 | Apte et al. | 364/489 |
| 5,483,461 | 1/1996 | Lee et al. | 364/490 |

OTHER PUBLICATIONS

S. V. Venkatesh, "Hierarchical Timing–driven Floorplanning and Place and Route Using a Timing Budgeter", IEEE 1995 Custom Integrated Circuits Conference, pp. 469–472.

Jon Frankle, "Iterative and Adaptive Slack Allocation for Performance–driven Layout and FPGA Routing", 29th ACM/IEEE Design Automation Conference, pp. 536–542.

Toshio Ikeda, Kazunari Kimura, Takaaki Udagawa, Katsumi Kuwayama and Tomoko Ishikawa, "aTAPLAS3 : A Constraint Driven and High–performance Layout System for Huge Design", IEEE 1992 Custom Integrated Circuits Conference, pp. 28.5.1–28.5.4.

Robert B. Hitchcock, Sr., Gordon L. Smith, David D. Cheng, "Timing Analysis of Computer Hardware", IBM J. Res. Develop., vol. 26, No. 1, Jan. 1982, pp.100–105.

Peter S. Hauge, Ravi Nair, Ellen J. Yoffa, "Circuit Placement for Predictable Performance", 1987 IEEE, pp. 88–91.

Garbers, J.; Korte, B.; Promel, H.J.; Schwietzke, E.; Steger, A.; "VLSI–placement based on routing and timing information"; EDAC, Proceedings of the European Design Automation Conference; pp. 317–321, Mar. 1990.

Sgragiwutz, E; Youssef, H.; Bening, L.C.; "Predictive tools in VLSI system design: timing aspects"; CompEuro 88—System Design: Concepts, Methods and Tools; pp. 48–55, Apr. 1988.

*Primary Examiner*—Thomas C. Lee
*Assistant Examiner*—Ki S. Kim
*Attorney, Agent, or Firm*—Townsend and Townsend and Crew LLP

[57] ABSTRACT

A method for performing a hierarchial timing driven layout of a circuit based upon gate-level design data and circuit timing constraints, the circuit including a plurality of cells, includes: partitioning the plurality of cells into a plurality of logical blocks, a first logical block including a first plurality of cells; budgeting a block timing constraint for each of the plurality of logical blocks in response to the gate-level design data, to the circuit timing constraints, and to the partitioning of the plurality of cells into the plurality of logical blocks; placing the plurality of logical blocks within a circuit floorplan, each logical block associated with a block location within the circuit floorplan; rebudgeting the block timing constraint for at least one of the plurality of logical blocks in response to the placement of the plurality of logical blocks within the circuit floorplan; placing the first plurality of cells within a block location associated with the first logical block; and rebudgeting the timing constraint for at least one of the plurality of logical blocks in response to the placement of the first plurality of cells within the first logical block.

37 Claims, 12 Drawing Sheets

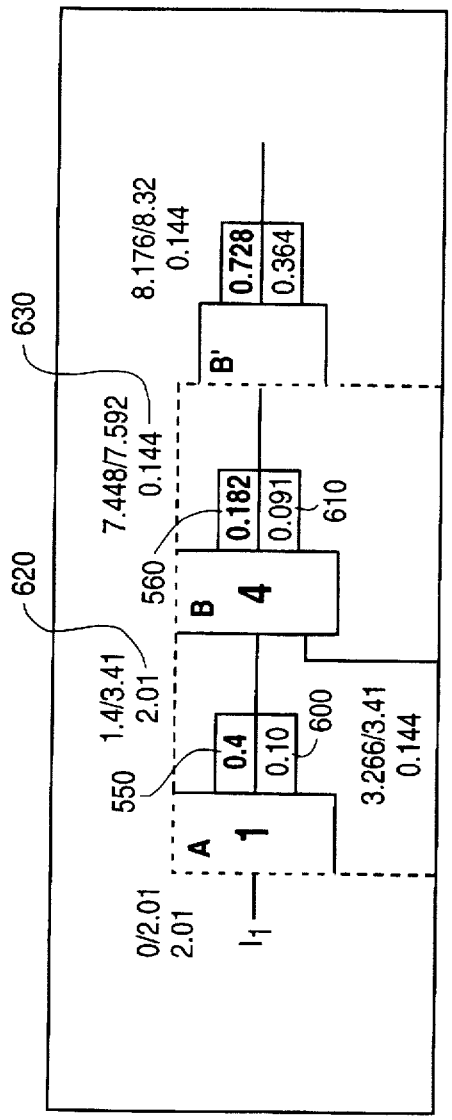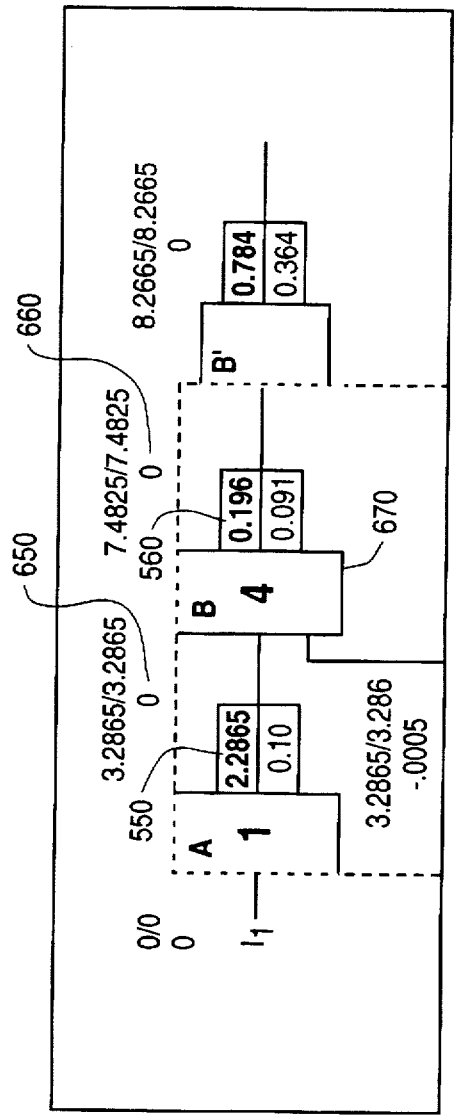

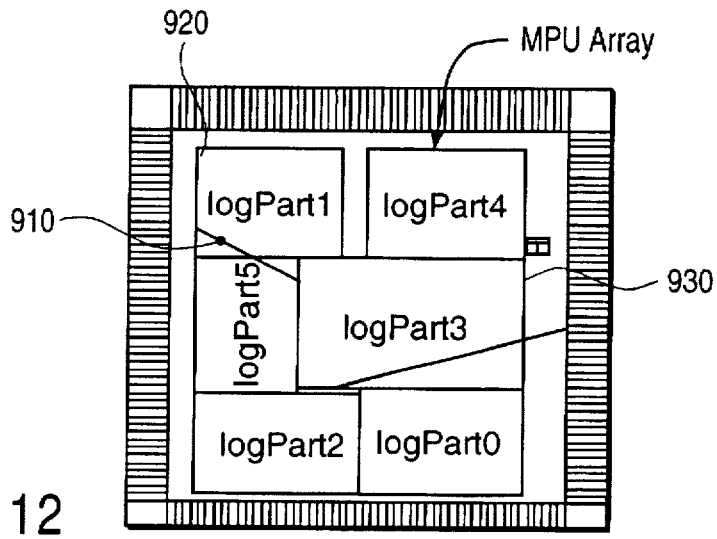

FIG. 12

Table 1. Blocks A & B Pin-Pair Timing Models Used for Timing-Driven Floorplanning

| No. | Description | Intrinsic Delay I | | Drive Factor K | | Unateness |
|---|---|---|---|---|---|---|
| | | Fall | Rise | Fall | Rise | |
| 1 | Block A | 22.73 | 32.83 | 1.47 | 4.24 | NonUnate |
| 2 | Block B | 95.81 | 119.40 | 1.53 | 2.09 | NonInvert |

FIG. 13A

Table 2. Budgets (ns) for Hierarchical Timing-Driven Design Generated by the Timing Budgeter

| No. | Description | Top | | Block A | | Block B | |
|---|---|---|---|---|---|---|---|
| | | Fall | Rise | Fall | Rise | Fall | Rise |
| 1 | Initialize floorplan | 180 | 220 | N/A | N/A | N/A | N/A |
| 2 | Before TD floorplan | " | " | 22.73 | 32.83 | 95.81 | 119.40 |
| 3 | Before TD placement A | " | " | 23.26 | 34.77 | 98.68 | 127.56 |
| 4 | Before TD placement B | " | " | 23.99 | 32.55 | 98.21 | 129.17 |
| 5 | After TD placement A&B | " | " | 28.22 | 35.96 | 70.09 | 94.55 |

FIG. 13B

Table 3. Delays (ns) with Hierarchical Timing-Driven Design Using the Timing Budgeter

| No. | Description | Top | | Block A | | Block B | |
|---|---|---|---|---|---|---|---|
| | | Fall | Rise | Fall | Rise | Fall | Rise |
| 1 | Initialize floorplan | 172.98 | 221.21 | 21.30 | 32.25 | 85.93 | 110.86 |
| 2 | After TD floorplan | 168.50 | 208.33 | " | " | " | " |
| 3 | After TD placement A | 169.21 | 206.02 | 22.16 | 30.35 | " | " |
| 4 | After TD placement B | 138.93 | 169.83 | " | " | 54.07 | 75.94 |

FIG. 13C

METHOD FOR HIERARCHICAL TIME DRIVE CIRCUIT LAYOUT BY REBUDGETING TIMING CONSTRAINTS OF PLURALITY OF LOGICAL BLOCKS AFTER PLACEMENT

FIELD OF THE INVENTION

The present invention generally relates to the field of computer-aided Design (CAD) tools for automating the design and verification of electronic systems and circuits. In particular, the present invention relates to methods and apparatus for performing hierarchial time budgeting during placement and routing of circuits to reduce costly iterations between physical layout and timing analysis.

BACKGROUND OF THE INVENTION

Transistor placement (cells) and wire routing (nets) of a circuit design on a substrate has become an important area for computer-aided design (CAD). Advances in circuit integration have made it possible for circuit designers to incorporate designs having more than a million transistors on a single chip. Using a traditional "flat" approach to place and route (P&R) such a circuit design can take several days. Further, faster clock cycles and critical path constraints make the traditional process even more complicated.

A problem with typical place and route systems is that the input and output signal timing requirements (circuit/global timing constraints) of the circuit are typically not considered until the circuit is entirely placed and routed. If the place and route does not meet the circuit/global timing constraints, the entire circuit layout is typically re-placed and re-routed; the new layout is then compared to the circuit timing constraints, and if the circuit timing constraints are still not met, the process repeats again.

A typical approach to solve large place and route problems is with a divide and conquer approach, also known in the art as the hierarchical approach. The hierarchical approach divides a large circuit design into smaller manageable blocks, places these blocks in unique block locations on a circuit "floorplan", and then each smaller block is then treated as a smaller layout problem. Although this hierarchial approach may simplify the place and route problem, such an approach also suffers the drawback described above that the circuit timing constraints are typically not considered until the circuit is entirely placed and routed.

Applying the hierarchial approach to the place and route with circuit timing constraints encounters problems not seen with the hierarchial approach to the place and route problem alone. For example, circuit timing constraints have to be satisfied within the hierarchial blocks as well as across the hierarchical block boundaries. Since the circuit timing constraints must be handled locally within the blocks as well as globally between the blocks, the hierarchial approach to place and route with circuit timing constraints poses unique problems.

In a typical hierarchial design process, a timing expert assigns block timing constraints based on observation of a previous layout (realization) of the block or based on the expert's intuition, experience, and knowledge of top-level timing constraints. When the physical layout tools are unable to meet their block constraints, the designer must ultimately resolve these issues by manually re-allocating the block timing constraints.

What is needed in this art is a hierarchical timing-driven design methodology that reduces or eliminates iterations between the place and route analysis and timing analysis, while allowing the designer to use a hierarchical timing driven approach. What is also needed is a hierarchical timing-driven management methodology that considers both the block timing constraints and the circuit timing constraints.

SUMMARY AND OBJECTS OF THE INVENTION

The present invention provides techniques and systems for performing hierarchial time budgeting during placement and routing of circuits.

According to a preferred embodiment, the method for performing a hierarchial timing driven layout of a circuit based upon gate-level design data and circuit timing constraints, the circuit including a plurality of cells, includes the step of partitioning the plurality of cells into a plurality of logical blocks, a first logical block including a first plurality of cells.

The method further includes the step of budgeting a block timing constraint for each of the plurality of logical blocks in response to the gate-level design data, to the circuit timing constraints, and to the partitioning of the plurality of cells into the plurality of logical blocks.

The method further includes the step of placing the plurality of logical blocks within a circuit floorplan, each logical block associated with a block location within the circuit floorplan.

Another step in the method includes rebudgeting the block timing constraint for at least one of the plurality of logical blocks in response to the placement of the plurality of logical blocks within the circuit floorplan.

Yet another step in the method includes placing the first plurality of cells within a block location associated with the first logical block.

The method also includes the step of rebudgeting the timing constraint for at least one of the plurality of logical blocks in response to the placement of the first plurality of cells within the first logical block.

According to another preferred embodiment of the present invention a method of determining a timing model for a logical block within a circuit, the memory having gate-level design data, including a plurality of cells and a plurality of nets for the logical block, and timing models for each of the plurality of cells, and circuit timing constraints, includes the step of: determining a slack budget factor for each of the plurality of nets, in response to the gate-level design data and the circuit timing constraints.

The method further includes the step of determining an net constraint for each of the plurality of nets, in response to the slack budget factor for each of the plurality of nets, to the gate-level design data and to the circuit timing constraints.

The method further includes the step of determining the timing model for the logical block, in response to the net constraint for each of the plurality of nets, to the timing models for the plurality of cells and to the circuit timing constraints.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which:

FIG. 7 illustrates a first iteration for a portion of the circuit design in FIG. 6 after the ZSA has been applied;

FIG. 8 illustrates a subsequent iteration of the ZSA for the portion of the circuit design in FIG. 6;

FIG. 12 illustrates a circuit floorplan example for use in the hierarchical timing-driven process;

FIGS. 13a–13c illustrates tables showing block timing constraints for blocks A and B;

FIGS. 14 14a and 14b illustrate multiple required arrival times for signals for a block;

DETAILED DESCRIPTION OF THE INVENTION

The present invention is directed to a hierarchical timing-driven design methodology based on the timing budgeter which reduces the need to perform costly iterations between physical layout and timing analysis.

Broadly, the preferred embodiment of the present invention entails using a hierarchial approach to place and route large circuit designs while considering timing constraints. In the preferred embodiment, a circuit layout is divided into smaller manageable blocks for floorplanning and hierarchical place and route. Timing constraints for the circuit are budgeted among the blocks to perform a timing driven placement of the cells inside the block. Block timing models are then developed to perform a timing driven placement of the blocks in the circuit floorplan. The block timing constraints and the block timing models are continuously refined as the cells are placed inside each block. New improved timing constraints (timing budgets) and block timing models are then created based upon the current physical layout of the block, and the overall layout of blocks surrounding the block. This approach can be applied to multiple levels of abstraction. Further description of a preferred embodiment of the present invention is found in "Hierarchial Timing-driven Floorplanning and Place and Route Using a Timing Budgeter" by S. V. Venkatesh, Proc. IEEE Custom Integrated Circuits Conference, 1995, pp 23.4.1–23.4.4, and hereby incorporated by reference.

Definitions

"Block timing constraint" is the amount of time budgeted, from the circuit timing constraints, for a block. In a preferred embodiment, block timing constraints are often used to determine how cells are placed within a block.

"Block timing model" is a timing model for a block. In the preferred embodiment, a block timing model for a block is often used to determine how blocks are placed within a timing driven top-level circuit floorplan.

"Slack" is the amount of time between the arrival time of a signal at an output of a cell, block, or circuit, and the required arrival time of the signal.

"Net", as is well known in the art, is an interconnection wire.

"Net constraint" is the amount of time budgeted for a net.

System Overview

Figure 1:
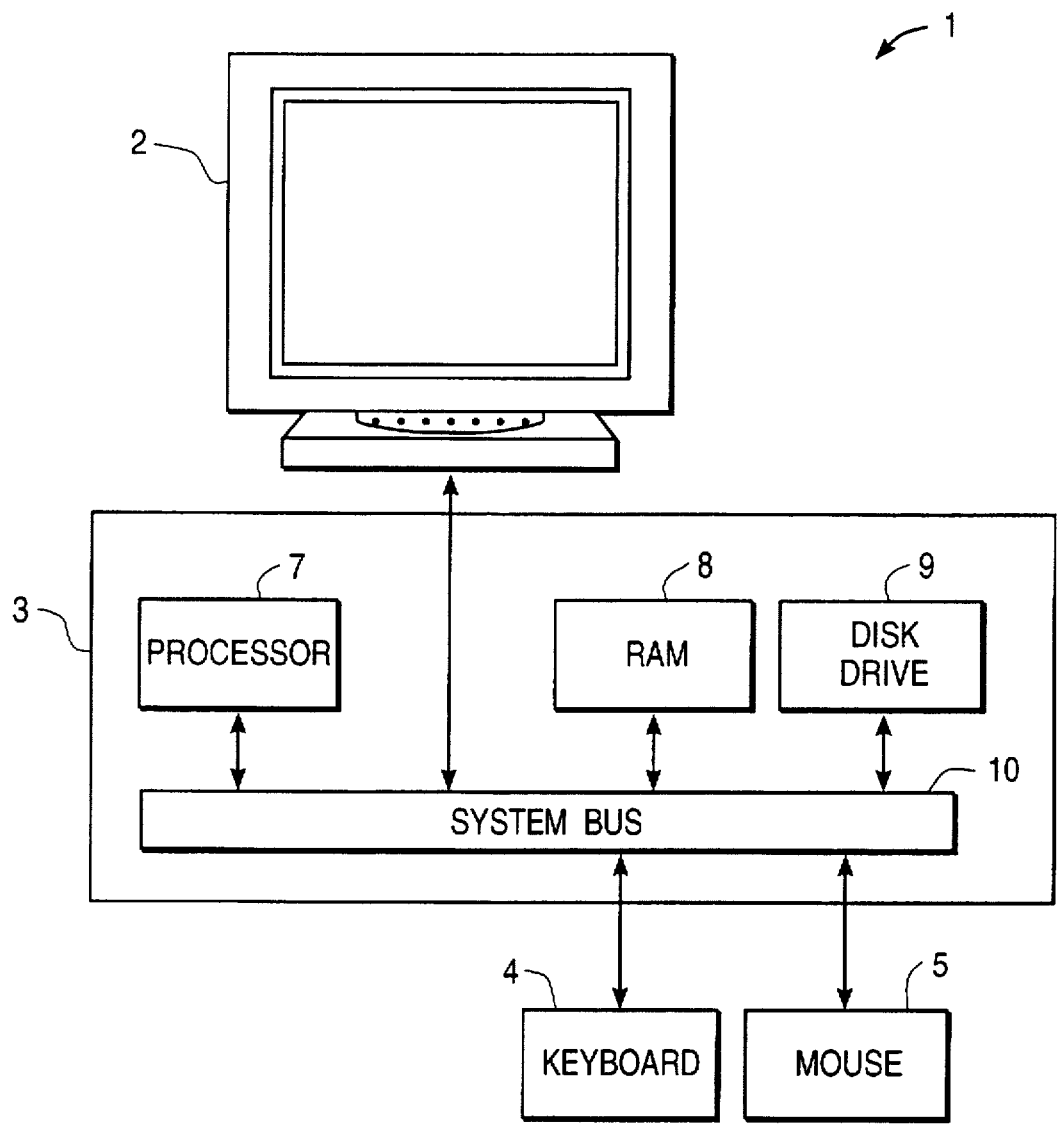
FIG. 1 is a block diagram of a system according to a preferred embodiment of the present invention.

FIG. 1 is a block diagram of a system 1 according to a preferred embodiment of the present invention. System 1 includes a display monitor 2, a computer 3, a keyboard 4, and a mouse 5. computer 3 includes familiar computer components such as a processor 7, and memory storage devices such as a random access memory (RAM) 8, a disk drive 9, and a system bus 10 interconnecting the above components.

In a preferred embodiment, system 1 includes a Sun Microsystems Sparc station, running SUNOS 4.1.3. and DFII software available from Cadence Design Systems Version 4.3.

Timing Budgeter

Figure 2:
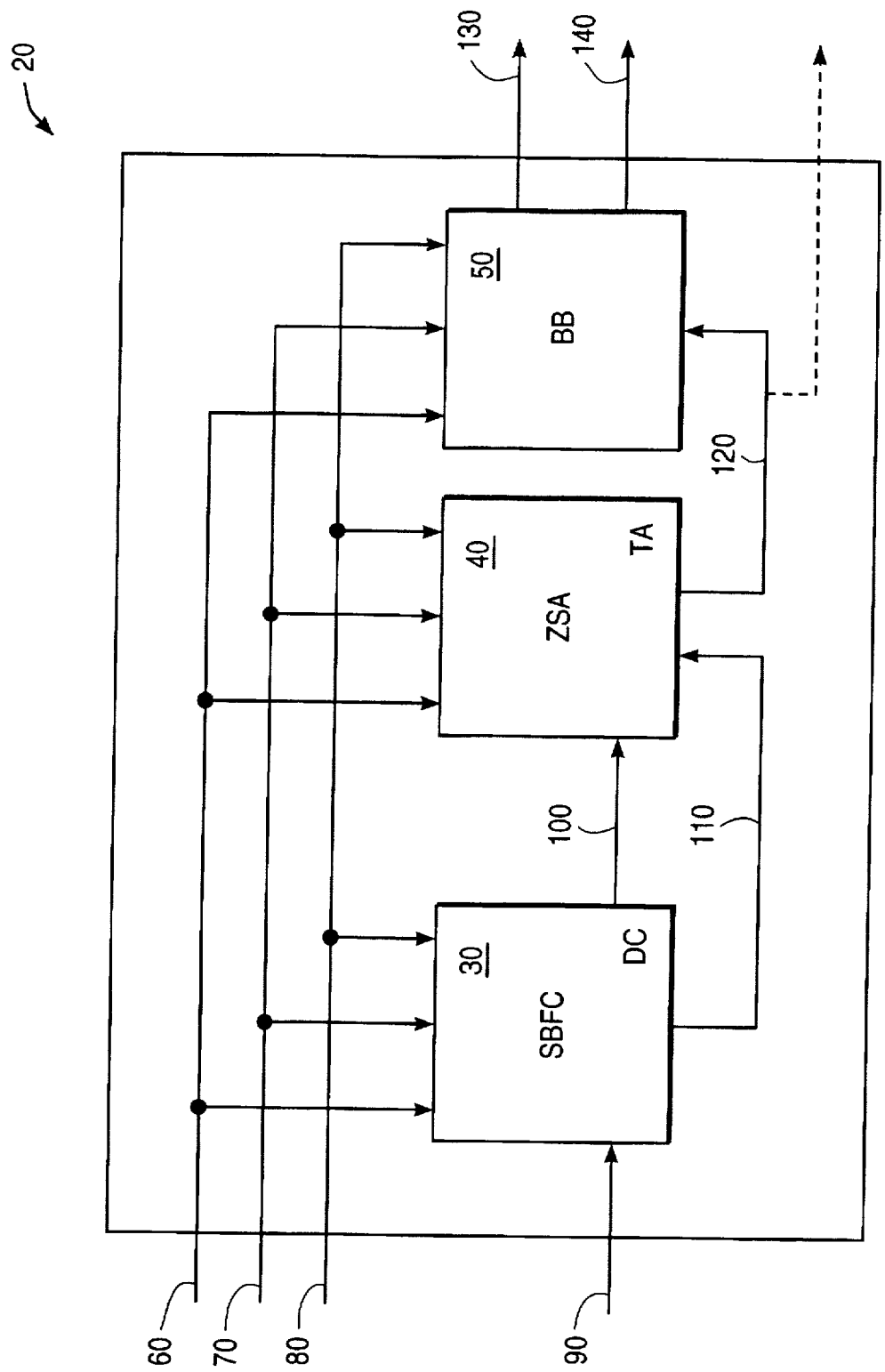
FIG. 2 is a block diagram of a preferred embodiment of the present invention.

FIG. 2 is a block diagram of a preferred embodiment of the present invention. Timing budgeter 20 includes modules Slack Budget Factor Calculator (SBFC) 30, Zero Slack Algorithm Module (ZSA) 40, and Block Budgeter (BB) 50. Inputs to these modules include a partitioned netlist 60, a cell library 70 including timing data, and the circuit/global timing constraints 80. Input 90 to SBFC 30 indicates a physical design status, input 100 to ZSA 40 provides a slack budget factor for each net within a circuit, input 110 to ZSA 40 provides delays for each net within the circuit, input 120 to BB 50 provides net constraints, i.e. constraints for each net within the circuit. Outputs from timing budgeter 20 (block budgeter 50) include block timing constraints 130 and block timing models (data) 140.

Timing budgeter 20 budgets or divides the top-level circuit/global timing constraints among logical blocks within a circuit to form block timing constraints. Timing budgeter 20 also creates timing models for each block based partly upon the block timing constraints and cell timing models.

Timing budgeter 20 takes as input a circuit that has already been logically partitioned into blocks, partitioned netlist 60, for the hierarchial place and route process. Since the hierarchial place and route process typically progresses from a top-level floorplanned stage to a bottom-level final cell placement stage, input 90 indicates the current physical design status of the place and route process.

The circuit/global timing constraints on input 80 are specified as arrival times on all primary inputs to the circuit and required arrival times on all primary outputs of the circuit. As will be discussed later, critical/global timing constraints can also be specified as critical path constraints.

Slack Budget Factor Calculator (SBFC)

In the preferred embodiment, Slack Budget Factor Calculator (SBFC) module 30 generates interconnect or net delays 110 and slack budget factors on input 100 based on the knowledge of the physical design status. The Slack Budget Factor (SBF) is the multiplier used to augment net delays in each iteration of the ZSA. Further information regarding Slack Budget Factors can be found in the following references: P. S. Hauge, R. Nair, and E. J. Yoffa, "Circuit Placement for Predictable Performance." Proc. ICCAD, 1987, pp. 88–91; and Jon Frankle, "Iterative and Adaptive Slack Allocation for Performance-driven Layout and FPGA Routing", 29th ACM/IEEE Design Automation Conference proc. 1992, pp 536–542.

Slack budget factors are calculated based on criteria quantified by a weight function w(c). SBFs can be built based on any weight function w(c), however judicious choices for a block will result in more accurate net constraints for that block, because of the role the SBF plays in the ZSA. In the preferred embodiment, the recommended weight function is set to the wire interconnect delay, which is typically based on interconnect/wire length estimates. Improved net constraints and hence improved timing budgets are obtainable for circuits by maintaining a historical database of actual wire lengths of previous circuit layouts, other approaches include expensive iterations between physical layout and timing analysis.

ZSA Module

In the preferred embodiment, ZSA module 40 implements the Zero Slack Algorithm using the SBFs from input 100 and the initial net delays on input 110 to determine net constraints (or budgets) for each net in the circuit. Further information regarding the Zero Slack Algorithm can be found in the two references cited above.

In a preferred embodiment, ZSA module 40 distributes slack, as described above, of signals in the circuit to nets in the circuit in response to the SBFs. These net constraints are input to block budgeter 50 on input 120.

Block Budgeter (BB)

In the preferred embodiment, block budgeter 50 transforms the net constraints into block timing constraints 130 and builds block timing models 140. Of course either output is independently obtainable from block budgeter 50. When hierarchical blocks are created by the place and route process, block budgeter 50 splits the circuit/global timing constraints among the hierarchial blocks.

The block timing constraints are defined as the timing constraints on the path segments or sub-paths of each block. In the preferred embodiment of the present invention, the block timing constraint is obtained by adding all the net constraints 120 of the nets (from ZSA module 40) and the intrinsic delays of the cells that belong to the sub-path inside the block (from the cell library).

In the preferred embodiment of the present invention, the block timing model is obtained from the block timing constraint and the constituent cell timing models of cells within the block. Equation 1 illustrates the relationship of a simple timing model for a block, using a simple linear timing model for pin-to-pin delays.

$$D=I+K*\text{load} \qquad (1)$$

In Equation 1: D is the block pin-to-pin delay, I is the intrinsic block pin-to-pin delay of block, K is the delay sensitivity to a capacitance load, and load is the load capacitance. In the preferred embodiment, the intrinsic pin-to-pin delay (I) is set equal to block timing constraints, and K is set equal to the delay sensitivity of the last cell in the sub-paths of the circuit (commonly a cell coupled to an output of the block).

Output of the Timing Budgeter

The timing budgeter 20 creates block timing constraints 130 and the block timing models 140 required for the hierarchial timing driven layout. An example illustrating the method is described below.

Figure 3:
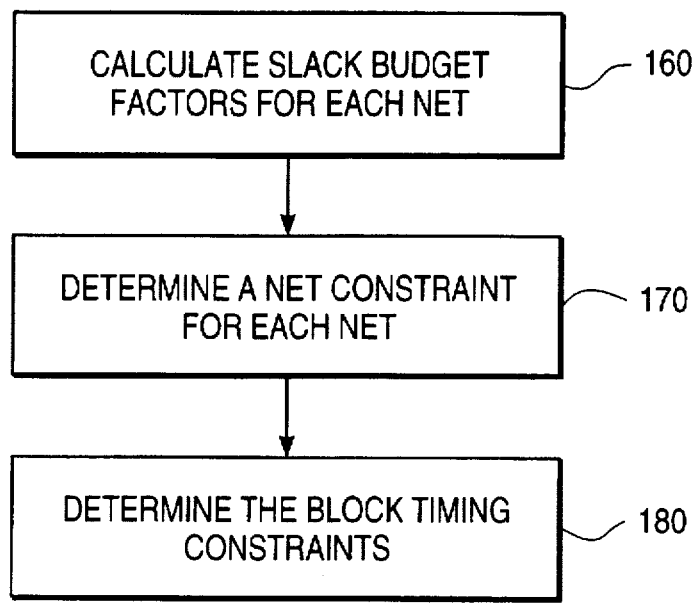
FIGS. 3 and 4 illustrate a preferred embodiment of a flow diagram of the process of determining a block timing constraint and a block timing model.
Figure 4:
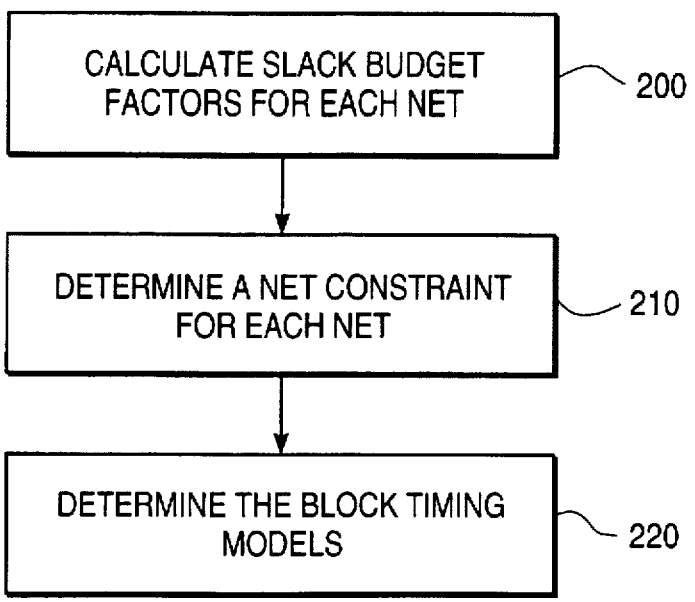

FIGS. 3 and 4 illustrate a preferred embodiment of a flow diagram of the process of determining a block timing constraint and a block timing model, respectively.

In FIG. 3, based upon gate-level design data and the circuit timing constraint, slack budget factors are calculated for each of the nets in the circuit, step 160. In a preferred embodiment of the present invention, SBFC 30 may be used for this step. Next, based upon the slack budget factors for each of the nets, the gate-level design data, and the circuit timing constraint, a net constraint for each net is determined, step 170. In a preferred embodiment, ZSA module 40 may be used for this step.

The block timing constraints are then determined in response to timing models for the cells, the net constraints for each cell, and the circuit timing constraints, step 180. In a preferred embodiment, BB 50 may be used for this step.

In FIG. 4, based upon gate-level design data and the circuit timing constraint, slack budget factors are calculated for each of the nets in the circuit, step 200. In a preferred embodiment of the present invention, SBFC 30 may be used for this step. Next, based upon the slack budget factors for each of the nets, the gate-level design data, and the circuit timing constraint, a net constraint for each net is determined, step 210. In a preferred embodiment, ZSA module 40 may be used for this step.

The block timing models are then determined in response to timing models for the cells, the net constraints for each cell, and the circuit timing constraints, step 220. In a preferred embodiment, BB 50 may be used for this step.

Example of Time Budgeting

The use of the timing budgeter of the present invention is best illustrated by means of an example which shows how the timing budgeter generates block timing constraints and block timing models.

Figure 5:
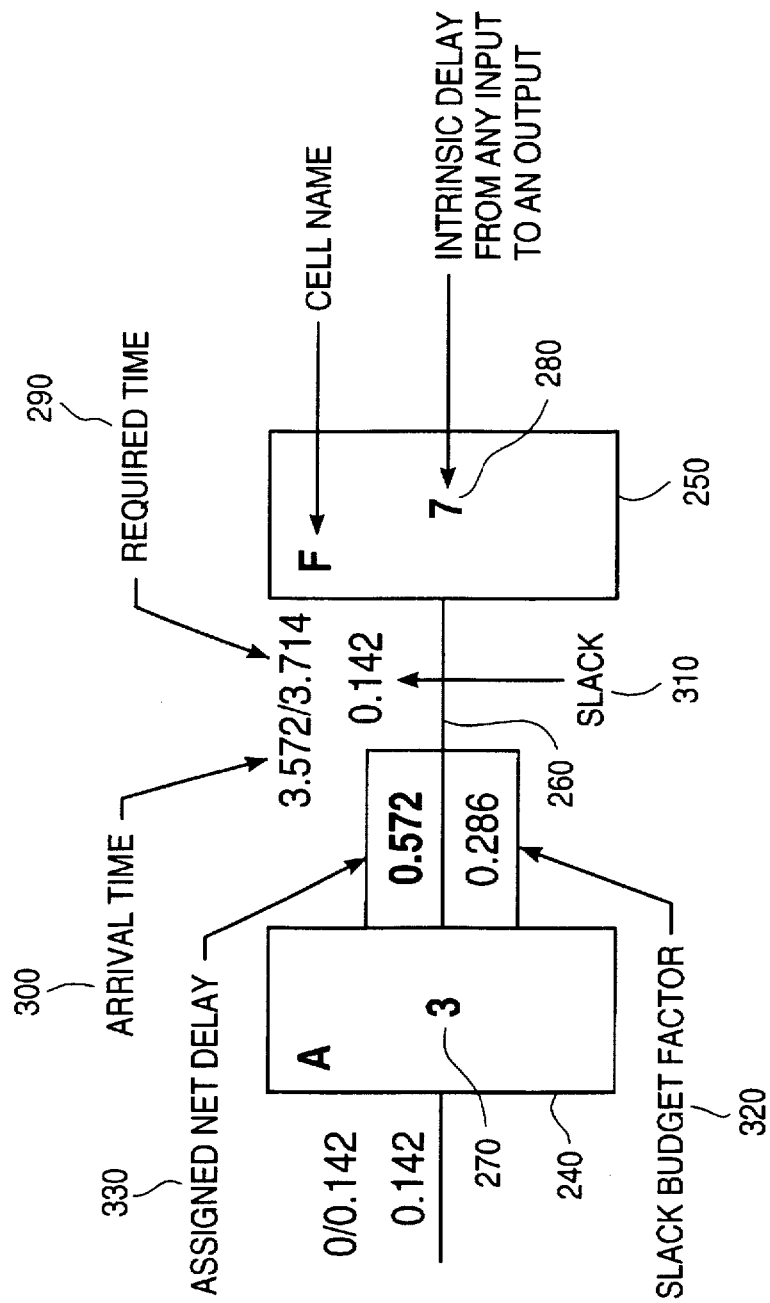
FIG. 5 provides the key defining the values shown in the various iterations of the present invention.

FIG. 5 provides the key defining the values shown in the various iterations of the present invention. Cells 240 and 250 are coupled by net 260. Cells 240 and 250 include an intrinsic delay 270 and 280, respectively. The signal on net 260 has a required arrival time 290 and an arrival time 300. The difference between required arrival time 290 and arrival time 300 for the signal defines the slack 310 for the signal. These three times, required arrival time, arrival time, and slack are referred to as a timing triplet for net 260. Alternatively, a timing pair include the required arrival time and the arrival time. Net 260 also includes a slack budget factor 320 and an assigned net delay (net constraint) 330.

Figure 6:
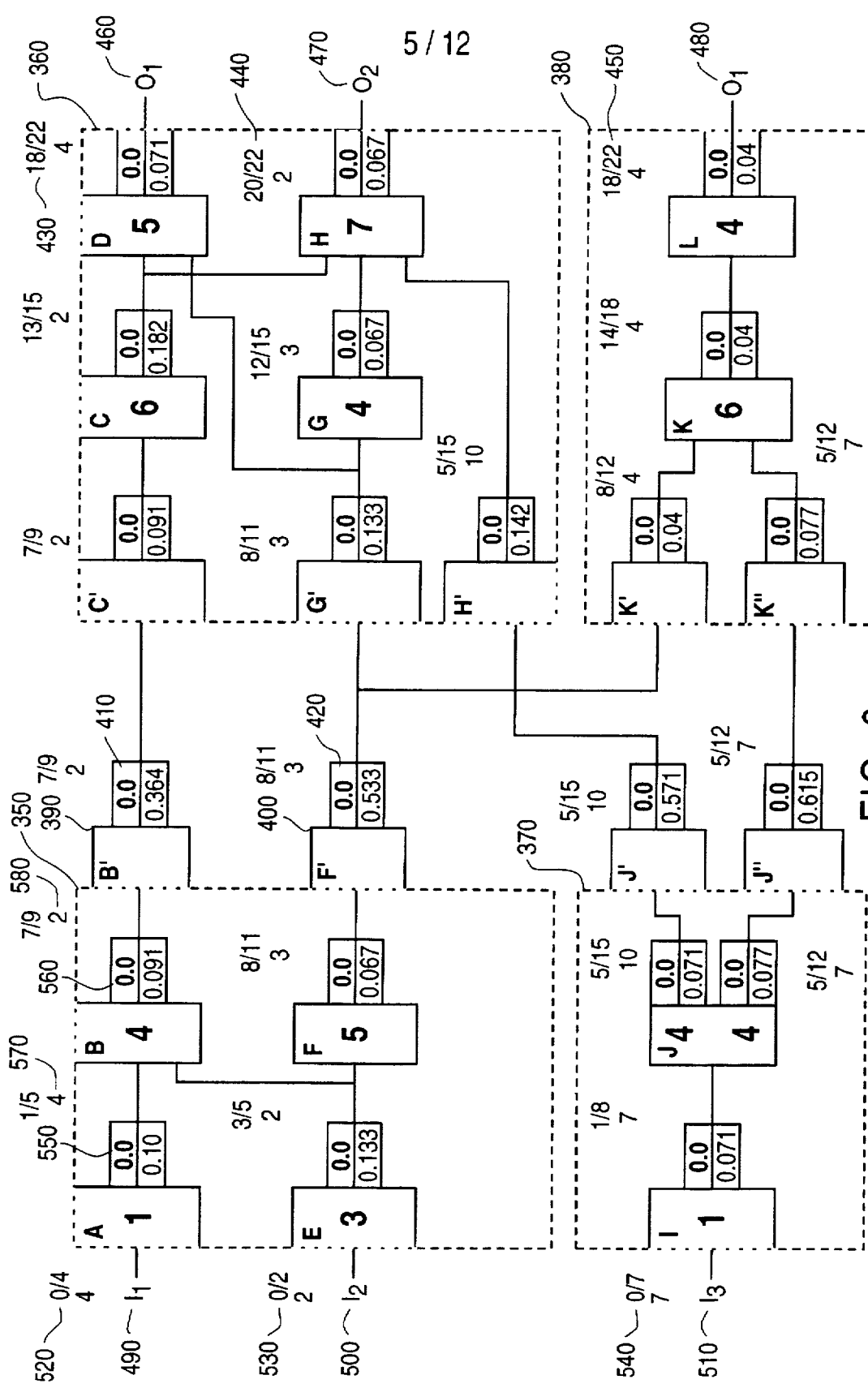
FIG. 6 illustrates a circuit design that has been partitioned into four blocks and illustrates block timing constraints.

FIG. 6 illustrates a circuit design that has been partitioned into four blocks 350, 360, 370, 380 and illustrates block timing constraints. The timing budgeter introduces pseudo-cells B' 390, F' 400, etc. at the block boundaries to hold net constraints (budgets) 410 and 420 that are assigned to the block paths. The example illustrates a situation where all paths shown have the same required arrival time 22 430, 440, 450 at the primary outputs 460, 470, 480. The arrival times at all primary inputs 490, 500, 510 is 0 520, 530, 540. Because circuit paths from inputs 490, 500, 510 to outputs 460, 470, 480 are partitioned among different logical blocks 350, 360, 370, 380, the timing budgeter's task is to determine the timing constraints on the new path segments or sub-paths in blocks 350, 360, 370, 380, (block timing constraints).

Initially, the ZSA is applied systematically to update assigned net delay (constraint) 550, 560, etc. (also called net budgets) while reducing slack 570, 580, etc.

FIG. 7 illustrates a first iteration for a portion of the circuit design in FIG. 6 after the ZSA has been applied. According to the ZSA, the assigned net delay (net constraint) 550 and 560 are augmented by the product of slack budget factors 600 and 610 and the respective slack 570 and 580, in FIG. 6. Compared to the slack 570 and 580 in FIG. 6, slack 620 and 630 are reduced after this first iteration.

FIG. 8 illustrates a subsequent iteration of the ZSA for the portion of the circuit design in FIG. 6. Compared to the slack 620 and 630 in FIG. 7, slack 650 and 660 are reduced to zero, and the assigned net delay (net constraints) 550 and 560 are thus set. In a preferred embodiment, slacks are reduced to zero, however it should be understood that the slacks actually fall within a predetermined tolerance around zero.

Figure 9:
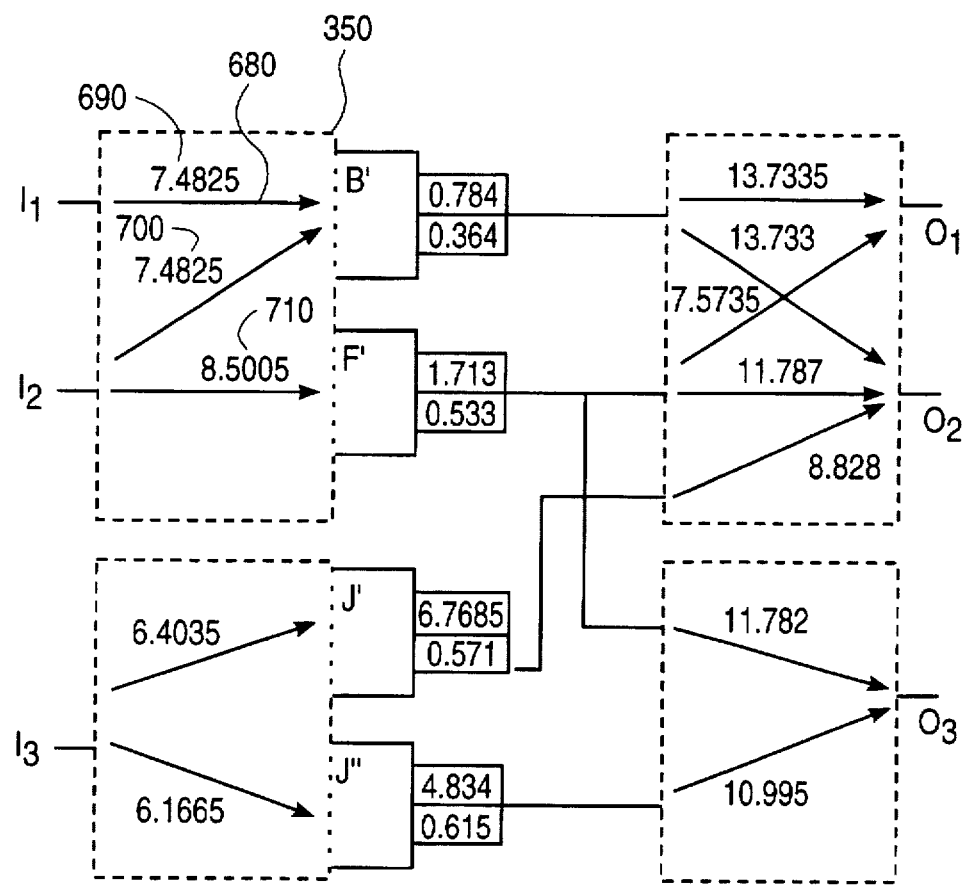
FIG. 9 illustrates the block sub-path timing constraints for the circuit design of FIG. 6.

FIG. 9 illustrates the block sub-path timing constraints for the circuit design of FIG. 6. Given the net budgets determined above, the timing budgeter of the present invention transforms the net budgets into block timing constraints (budgets). To generate specific block sub-path constraints, the timing budgeter adds all net constraints of the nets and the intrinsic delays of the cells that belong to the sub-path inside the block, such as sub-path 680 in block 350.

The block timing constraints 690, 700, 710 are illustrated in FIG. 9. Based upon these block timing constraints, the internals (cells or sub-blocks) of the block can now be placed using these block timing constraints.

To create a block timing model, the timing budgeter implements the relationship of Equation 1. In the preferred embodiment, the timing budgeter sets a block's intrinsic pin-to-pin delay (I) equal to the block budgets developed for the sub-path of the block (690, 700, 710 in FIG. 9). The timing budgeter then sets the load sensitive delay factor (K) of the block to the load sensitive delay factor K of the last cell in the sub-path (for example 670, in FIG. 8). As illustrated in FIG. 9, this means that the I of pin-pair $I_1B'$ is 7.4825 ns and the K of pin-pair $I_1B'$ can be set equal to that of cell B.

The resulting block timing model for a block is thus dependent on the variable "load" in equation 1. Based upon the interconnections between the blocks, the "load" can be determined. Once the "load" for each block has been determined, the predicted delay for the circuit can be determined.

Hierarchical Timing Driven Layout

Figure 10:
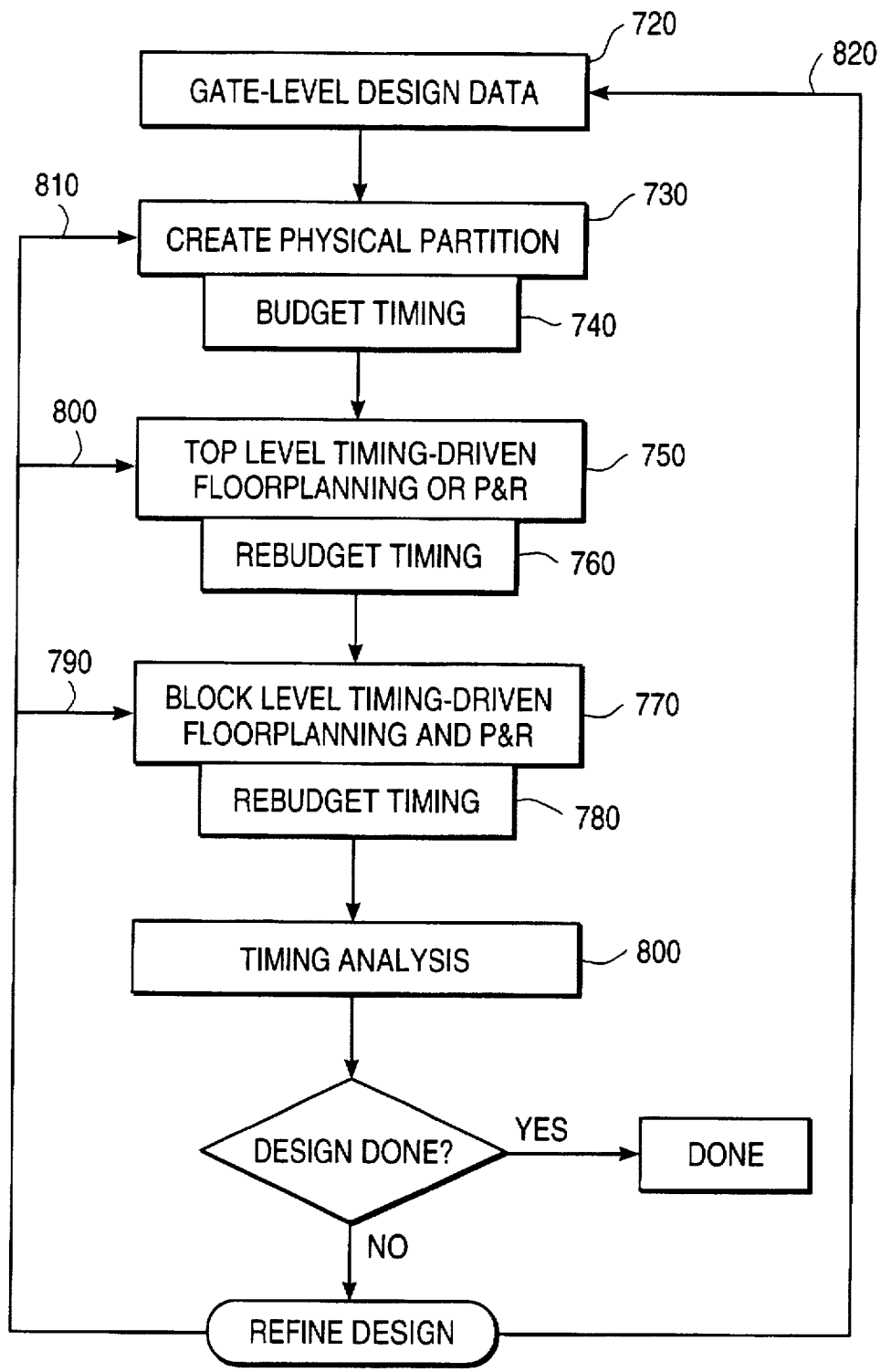
FIGS. 10 and 11. illustrates an embodiment of a flow diagram of the hierarchical timing driven layout method.
Figure 11:
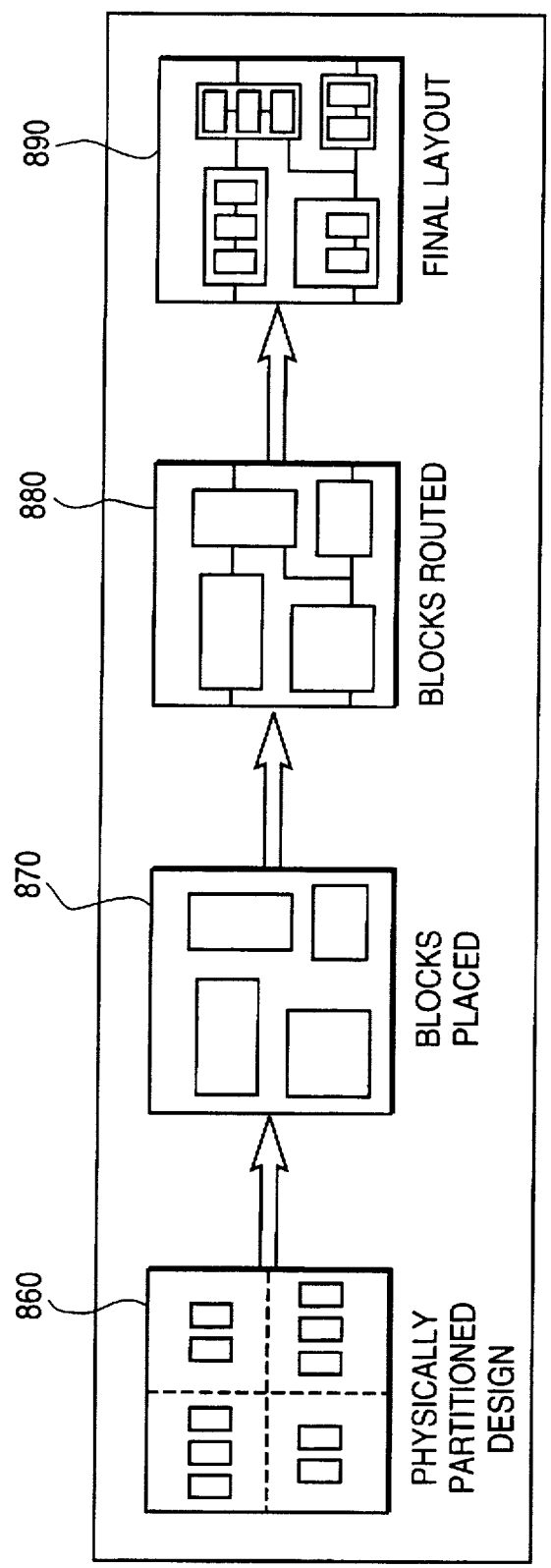

FIGS. 10 and 11 illustrates an embodiment of a flow diagram of the hierarchical timing driven layout method. In FIG. 10, a gate level design is generated for a circuit including cells and nets, step 720. This circuit is then physical partitioned into logical blocks, step 730. This partitioning may be implemented using any standard circuit partitioning algorithm. This step is also illustrated as 860 in FIG. 11.

Next, based upon the circuit/global timing constraints, block timing constraints for each block is determined, step 740. In the preferred embodiment of the present invention timing budgeter 20 described above is used to budget the global timing constraints between the blocks.

Next, the blocks are physically placed within a circuit floor-plan, step 750. This placement may be implemented using any standard block placement algorithm. This step is also illustrated as 870 and 880 in FIG. 11. Based upon the placement of the blocks in relation to each other in the floor plan, the block timing constraints are rebudgeted, step 760. In the preferred embodiment of the present invention timing budgeter 20 described above is used to rebudget the global timing constraints between the blocks.

Next, the cells within each block are physically placed within the block location in the circuit floor plan, step 770. This placement may be implemented using any standard cell placement algorithm. This step is illustrated for all blocks as 890 in FIG. 11.

Based upon the placement of cells within a block location, a predicted delay for the block can be determined. If the predicted delay for the block is less than the block timing constraint, the block timing constraint may be lowered. Once the block timing constraint is lowered, the timing constraints for other blocks in the circuit can be increased (loosened up). This rebudgeting of step is illustrated as step 780.

Based on the placement of cells within a block, a new set of block timing constraints (budgets) can be determined for the blocks whose internals are yet to be placed. This is shown in step 780. Unplaced blocks are now placed using new timing budgets, path 790. Typically steps 770 and 780 are repeated for all blocks in the circuit until each block has been placed. In the preferred embodiment of the present invention timing budgeter 20, described above, is used to rebudget the global timing constraints between the blocks.

Occasionally situations may arise when other iterations of the flow diagram may be required.

Based on the placement of cells within the block location, a predicted delay for a block can be determined, step 800. If the predicted exceeds the block timing constraint, selecting another block in the circuit adjacent from the timing view point, and rearranging the cells within the block can increase the first block timing constraint which is obtained by rebudgeting, step 780. With the increased block timing constraint a successful placement of cells within the first block can be achieved.

Typically, a predicted circuit delay is determined and compared to the circuit timing constraint after placement of each block. If the circuit delay exceeds the circuit timing constraint, several alternate approaches are possible: The blocks of the circuit can be placed within a new circuit floorplan, path 800; The circuit can partitioned into a new sets of logical blocks, path 810; and in the extreme case, the circuit can be redesigned with a new set of cells, path 820.

The above iterations indicate that the criteria, typically net length or net delay estimates, chosen for developing the initial timing budgets were not sufficiently accurate.

To get more accurate estimates, the net/wire lengths are preferably statistically characterized in the floorplanning and P&R tools. Since net delays depend on net lengths, they both can be statistically characterized based on a few parameters such as estimated size of blocks and the numbers of pins connected (fanout). These relations can vary with the design type, P&R tool used, the technology, and the library implemented. For example, wire lengths and their delays vary according to the number of layers in the design. A 3-layer design will have shorter wires than a 2-layer design. Good net delay/length estimation (or any other criteria such as historically based length estimates for the nets), translates to a more sensible apportioning of timing budgets between the blocks, which leads to successful, non-iterative timing-driven hierarchical design. If timing constraints are hopelessly tight then the only possibility is to relax them or re-design/re-synthesize the logic itself. This is indicated in the flow chart of FIG. 10 by the loop back to gate-level design data.

In a preferred embodiment of the present invention, the timing budgeter continuously refines and improves the accuracy of the timing constraints as the design progresses. It adjusts the block timing constraint on a block based on the current physical layout of the block and the overall layout surrounding the block that is relevant from a timing point of view. The block timing constraints (budgets) are chosen in a manner that increases the likelihood of their satisfaction by the layout tools. The method provides an improved chance of satisfying the timing constraints of a large hierarchical design in a reduced number of passes of physical layout and timing analysis.

Example of Hierarchical Timing-Driven Design using the Timing Budgeter

FIG. 12 illustrates a circuit floorplan example for use in the hierarchical timing-driven process. Results pertaining to only path 910 and critical path constraint is discussed to facilitate the explanation. The circuit design represented is a gate array design with 1653 cell/gates, 1873 nets, that is partitioned into six logical blocks, thus creating two levels of hierarchy. logPart1 920 and logPart3 930 in FIG. 12 are referred to as block A and block B, respectively. The path constraint, discussed below, traverses only blocks A and B, and all delays and constraints are maximum values.

Initially, the timing budgeter creates block timing models and block timing constraints for blocks in order to perform timing-driven placement of blocks, as described in the proceeding sections. FIG. 13a illustrates a table showing block timing constraints for blocks A and B. The timing budgeter first determines block timing constraints (budgets) for blocks A and B that the cell placement algorithm may be able to satisfy. In the preferred embodiment of the present example, the Rise time and Fall time for the signals are both considered. These block timing constraints are represented in Fall column 950 and Rise column 960

FIG. 13b illustrates a table showing block timing constraints for blocks A and B at different stages of the hierarchical timing-driven process. These block timing constraints are represented in Fall columns 980, 990 and Rise columns 1000, 1010. As illustrated from the comparison of the successive rows in FIG. 13b, the block timing constraints are allocated and reallocated by the budgeter as the hierarchical timing-driven process continues.

FIG. 13c illustrates a table showing the predicted delay of blocks A and B at different stages of the hierarchical timing-driven design process.

An advantage of the preferred embodiment of the present invention is that it automatically reallocates block timing constraints as the design progresses. As illustrated in row 1030 in FIG. 13b, Block B is initially assigned a rise and fall timing constraints (budget) of 95.81 and 119.40 ns respectively. After a timing-driven floorplan step (placement of A), new higher timing constraints of 98.68 and 127.56 ns are assigned. The increase in the timing constraints may reflect, for example, the situation in which block A and B are positioned closer together than initially estimated. Because the inter block delay is decreased, the timing constraints of block A and B can be increased.

As further illustrated in row 1040 in FIG. 13b, the timing constraint (budgets) for block B are further adjusted after the cells in block A are placed. This re-budgeting of the timing constraints may be performed because of the increased information available about block A and the surrounding blocks. As suggested in path 790 in FIG. 10, if the layout of block A does not met the block timing constraint (budget) for block A, the process can continue and lay out block B. After block B is placed, the timing constraints for the blocks can be re-budgeted, possibly leading to an increased block timing constraint for block A.

Timing Budgeter For Critical Path Timing Constraints

The timing constraints on the circuit are typically specified by providing the required arrival times at primary outputs and arrival times at primary inputs. Since the clock periods of the circuit determine the required arrival times at the primary outputs, they are equal for all paths ending at a primary output. Another way to specify timing constraints is to use a critical path analyzer and develop a set of critical path constraints, and then ensure that these critical path constraints are satisfied all through the design. The advantages of this approach are that the analyzer can be used to eliminate false paths, loops and other issues and create a set of relevant constraints.

To handle timing constraints, specified as a set of critical path constraints, another embodiment of the timing budgeter is used, extending the functionality of the above described timing budgeter.

Figures 14A, 14B:
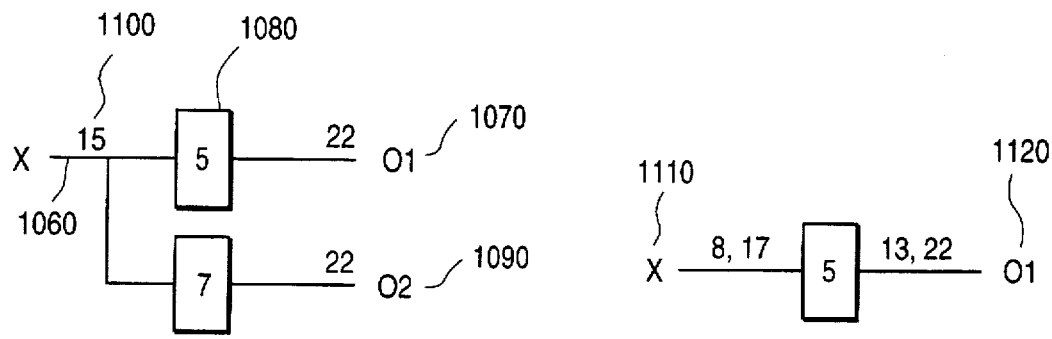

FIG. 14a illustrates required arrival time calculations when a single required arrival time is specified at the primary output. In FIG. 14a, by backward traversal, the required arrival time of a signal at X 1060 from O1 1070 is 17 (which is the required arrival time minus the delay 5 of cell 1080, i.e. (22−5=17)) and the required arrival time of a signal at X 1060 from O2 1090 is 15 (which is 22−7=15). Because the earliest arrival time is 15, 15 is chosen as the required arrival time of a signal at X 1060. If 17 were selected as the required arrival time and a signal arrives at X 1060 at time 17, then the signal will arrive at O2 at time 24 (which is 17+7) which exceeds 22 and causes a timing violation.

In the case where O1 and O2 have different required arrival times, it can be seen that the analysis above still applies. Thus, if there is only one required arrival time at a specific output, any required arrival times at other timing assertion points can be determined by backward traversal from the outputs towards the inputs, and the required arrival times are set to the earliest required times within the circuit.

FIG. 14b helps explain required arrival time calculations when multiple required arrival times are specified at a primary output. FIG. 14b, illustrates a signal X 1110 having a first required arrival time and a second required arrival time. Required arrival times at O1 1120 are 13 and 22 depending on the path used to arrive at O1. At X 1110, it is not possible to say if the required arrival time is 8 or 17 (obtained by backward traversal) since it depends on the path a signal uses to arrive at X. Using the smaller required time of 8 (as opposed to 17) can be too pessimistic for a signal path that has a required arrival time of 22 at O1 1120 and 17 at X 1110. In order to address this problem, multiple required arrival times for each signal at timing assertion points must be determined because of the number of paths traversing the timing assertion points.

A path specific timing analysis must store multiple arrival times that correspond to the multiple required times to reflect the slack available for a path. The required arrival time and the arrival time together constitute a timing pair, that is stored at a timing assertion point.

Figure 15:
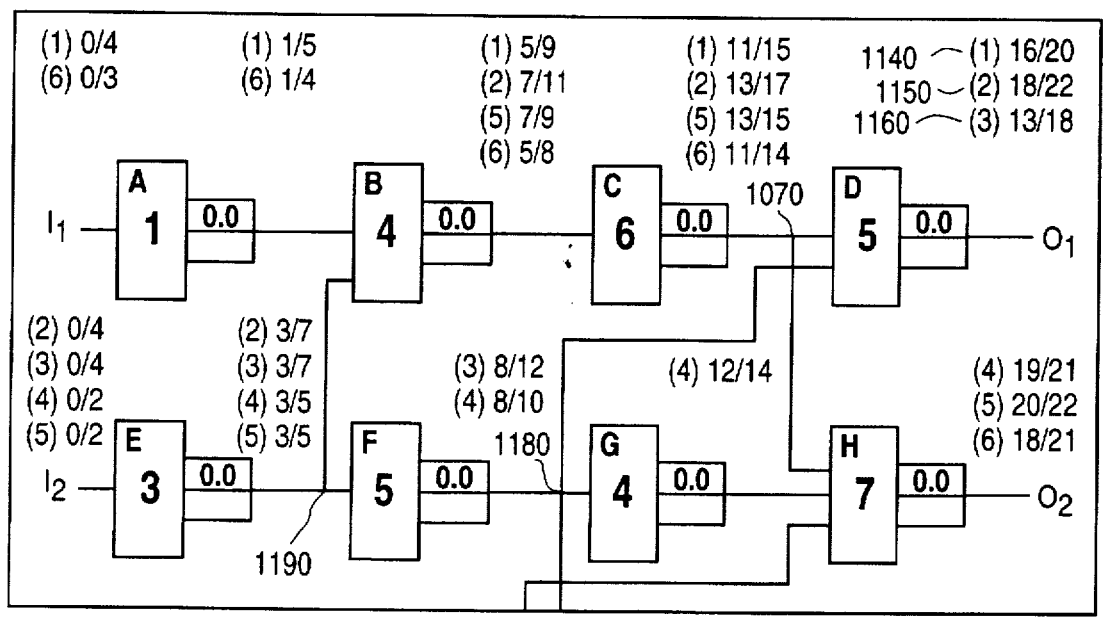
FIG. 15 illustrates the results of the timing analysis designed for path specific circuit designs.

FIG. 15 illustrates the results of the timing analysis designed for path specific circuit designs. As seen, timing pairs 1140, 1150, and 1160 for example, shows multiple arrival times for a signal and multiple required arrival times for each path, traversing the various timing assertion points 1170, 1180, 1190, etc. Each timing assertion point 1170, 1180, 1190, etc. has several timing pairs depending on the paths that traverse it. The path constraints for the design are as follows:

Path (1) ABCD=20;
Path (2) EBCD=22;
Path (3) EFD =18;
Path (4) EFGH=21;
Path (5) EBCH=22;
Path (6) ABCH=21.

This example is simplified to illustrate the process, thus it ignores the existence of different delays for rising and falling signals at the input of a cell and it treats all cells as having uniform non-inverting unateness.

Using 25A, the smallest slack value at each timing assertion point and the contiguous path segment with the smallest non-zero slack is selected. Slack distribution among the nets in the path segment then proceeds as described.

Figure 16:
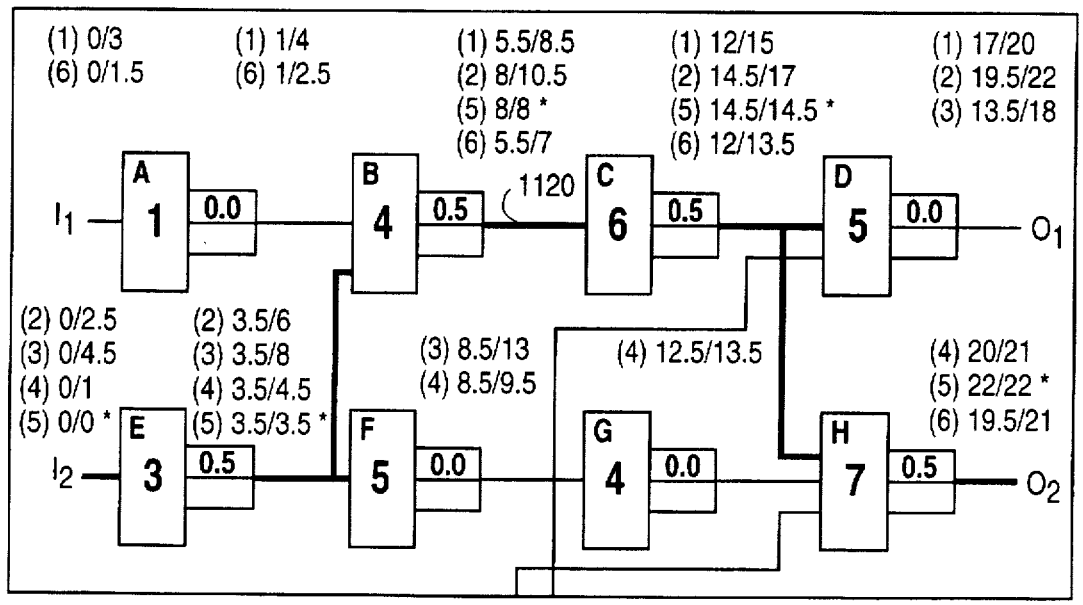
FIG. 16 illustrates a contiguous path segment identified with the smallest non-zero slack.

FIG. 16 illustrates a contiguous path segment 1120 identified with the smallest non-zero slack. The slack for this path is reduced to zero along the contiguous path segment, and the slacks are distributed according to the zero slack algorithm.

Figure 17:
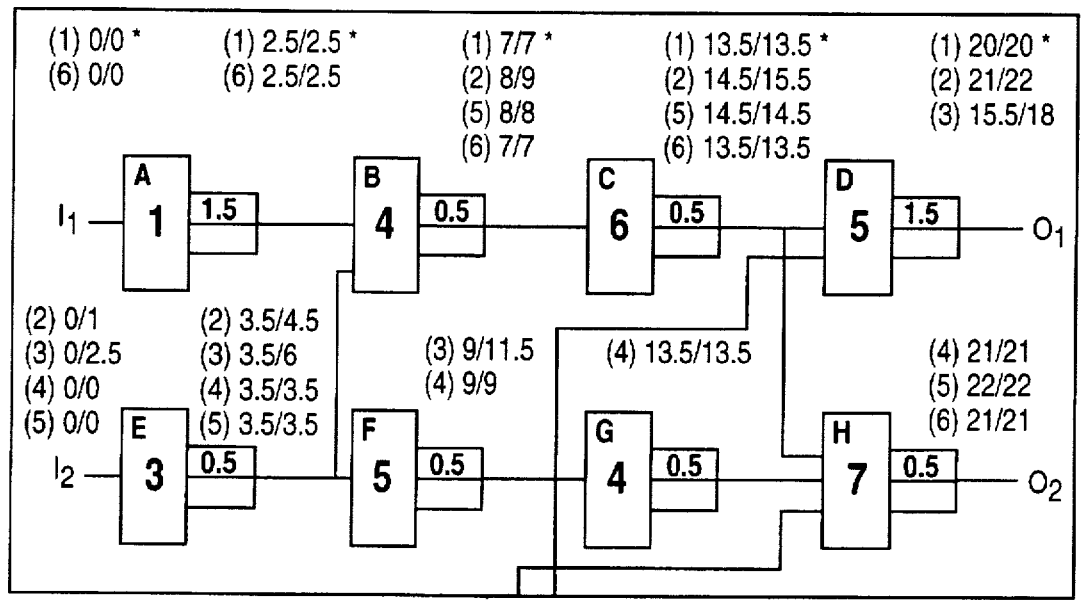
FIG. 17 illustrates timing pairs after a few iterations of the process above with slacks at all timing assertion points reduced towards zero.

FIG. 17 illustrates timing pairs after a few iterations of the process above with slacks at all timing assertion points reduced towards zero. (Note that not all critical paths have zero slack at the end.)

The important point to note here is that in an critical path situation, the slack at an interconnect is determined by identifying the least slack of all the critical paths that traverse the interconnect. In typical case, the least slack is determined automatically by the difference between the earliest required and latest actual arrival times at the interconnect. The path specific ZSA can have a complexity linear in the total number of nets involved. Using the critical path ZSA thus developed a Timing budgeter to handle critical path timing specification is available by replacing the ZSA module of FIG. 2 by the critical path ZSA module.

CONCLUSION

It should be pointed out that it is envisioned herein that the disclosed and claimed techniques of the present invention will find their end uses in all levels of circuit design, development, and implementation including computer software implementations.

A fast hierarchical timing-driven design methodology based on the timing budgeter, which reduces the need to perform costly iterations between physical layout and timing analysis, has been disclosed. The present invention allows the designer to use hierarchical timing driven design for large circuits. Tests with the timing budgeter and the hierarchical timing-driven design methodology of the present invention highlight the following advantages. The timing budgeter provides an automated method to allocate and re-allocate timing constraint budgets to the blocks of the hierarchical design, as opposed to manual allocation by timing expert. It manages and tracks the overall timing constraints as design progresses. In addition, the present invention handles all timing constraints simultaneously and takes advantage of the wire characterization data to assign budgets thereby providing more optimal solutions. If budgets are assigned manually by a timing expert, the assigned budgets tend to be sub-optimal as the problem is too large to solve manually. Further, it enables continuous refinement and improvement of timing as the design progresses thereby further improving the quality of the budgets. Costly iterations are effectively reduced or completely eliminated in some instances. The present method provides the best chance of satisfying the timing constraints of a large hierarchical design in one pass of physical layout and timing analysis.

It will be appreciated by those skilled in this particular art that the present invention can be embodied in other specific forms without departing from the spirit or essential characteristics thereof. The scope of the invention is therefore indicated by the appended claims rather than the foregoing description and all changes that come within the meaning and range of equivalents thereof are intended to be considered as being embraced within their scope.

What is desired to be secured by United States Letters Patents is:

1. In a computer system including a memory, a method for performing a hierarchial timing driven layout of a circuit based upon gate-level design data and circuit timing constraints, the circuit including a plurality of cells, the method comprising the steps of:

partitioning the plurality of cells into a plurality of logical blocks, a first logical block including a first plurality of cells;

budgeting a block timing constraint for each of the plurality of logical blocks in response to the gate-level design data, to the circuit timing constraints, and to the partitioning of the plurality of cells into the plurality of logical blocks;

placing the plurality of logical blocks within a circuit floorplan, each logical block associated with a block location within the circuit floorplan;

rebudgeting the block timing constraint for at least one of the plurality of logical blocks in response to the placement of the plurality of logical blocks within the circuit floorplan;

placing the first plurality of cells within a block location associated with the first logical block; and rebudgeting the timing constraint for at least one of the plurality of logical blocks in response to the placement of the first plurality of cells within the first logical block.

2. The method of claim 1, wherein a second logical block includes a second plurality of cells, the method further comprising the steps of:

placing the second plurality of cells within a block location associated with the second logical block; and rebudgeting the timing constraint for at least one of the plurality of logical blocks in response to the placement of the second plurality of cells within the second logical block.

3. The method of claim 1, wherein a second logical block includes a second plurality of cells, the method further comprising the steps of:

determining a predicted delay for the second logical block in response to the gate level design data;

comparing the predicted delay for the second logical block to the block timing constraint for the second logical block; and if the predicted delay for the second logical block exceeds the block timing constraint for the second logical block, rearranging the first plurality of cells within the block location associated with the first logical block, and rebudgeting the timing constraint for at least the second logical block in response to the rearranging.

4. The method of claim 1, further comprising the steps of:

determining a predicted delay for the circuit in response to the timing constraint for each of the plurality of logical blocks;

comparing the predicted delay for the circuit to the circuit timing constraints; and placing the plurality of logical blocks within another circuit floorplan, when the predicted delay for the circuit exceeds the circuit timing constraints.

5. The method of claim 1, further comprising the steps of:

determining a predicted delay for the circuit in response to the timing constraint for each of the plurality of logical blocks;

comparing the predicted delay for the circuit to the circuit timing constraints; and repartitioning the plurality of cells into another plurality of logical blocks when the predicted delay for the circuit exceeds the circuit timing constraints.

6. The method of claim 1, further comprising the steps of:

comparing a predicted delay for the circuit to the circuit timing constraints, the predicted delay formed in response to at least the timing constraint for each of the plurality of logical blocks; and redesigning the circuit, when the predicted delay for the circuit exceeds the circuit timing constraints.

7. A circuit formed in accordance with the method described in claim 1.

8. A computer system for performing hierarchial timing driven layout of a circuit based upon gate-level design data and circuit timing constraints, the circuit including a plurality of cells, the computer system comprising:

a memory for storing the gate-level design data and the circuit timing constraints;

partitioning means, coupled to the memory for partitioning the plurality of cells into a plurality of logical blocks, a first logical block including a first plurality of cells;

budgeting means coupled to the memory and to the partitioning means, for budgeting a block timing constraint for each of the plurality of logical blocks in response to the gate-level design data, to the circuit timing constraints, and to the partitioning of the plurality of cells into the plurality of logical blocks;

first placing means coupled to the memory and to the partitioning means for placing the plurality of logical blocks within a circuit floorplan, each logical block associated with a block location within the circuit floorplan;

first rebudgeting means coupled to the memory, to the budgeting means, and to the first placing means, for rebudgeting the block timing constraint for at least one of the plurality of logical blocks in response to placement of the plurality of logical blocks within the circuit floorplan;

second placing means coupled to the memory and to the partitioning means for placing the first plurality of cells within a block location associated with the first logical block; and second rebudgeting means coupled to the memory, to the second placing means and the first rebudgeting means, for rebudgeting the timing constraint for at least one of the plurality of logical blocks in response to placement of the first plurality of cells within the first logical block.

9. The computer system of claim 8, wherein a second logical block includes a second plurality of cells, the computer system further comprising:

third placing means coupled to the memory and to the partitioning means for placing the second plurality of cells within a block location associated with the second logical block; and third rebudgeting means coupled to the memory, to the third placing means and the second rebudgeting means, for rebudgeting the timing constraint for at least one of the plurality of logical blocks in response to placement of the second plurality of cells within the second logical block.

10. In a computer system including a memory, a method of determining a timing model for a logical block within a circuit, the memory having gate-level design data, including a plurality of cells and a plurality of nets for the logical block, and timing models for each of the plurality of cells, and circuit timing constraints, the method comprising the steps of:

determining a slack budget factor for each of the plurality of nets, in response to the gate-level design data and the circuit timing constraints;

determining a net constraint for each of the plurality of nets, in response to the slack budget factor for each of the plurality of nets, to the gate-level design data and to the circuit timing constraints; and determining the timing model for the logical block, in response to the net constraint for each of the plurality of nets, to the timing models for the plurality of cells and to the circuit timing constraints, wherein the timing model for the logical block includes a load-sensitive component.

11. The method of claim 10, wherein the slack budget factor for each of the plurality of nets is also determined in response to historically based length estimates for each of the plurality of nets.

12. The method of claim 10, wherein the timing model determining step comprises the step of:

determining a load sensitive delay factor of one of the plurality of cells.

13. The method of claim 10, wherein signals have required arrival times at outputs of the logical block, wherein for any one of the signals no two required arrival times exist which differ based on the path taken by the one signal.

14. The method of claim 10, wherein a signal has a first required arrival time and a second required arrival time at an output of the logical block, said first and second required arrival times dependent on the path taken by the signal, the net constraint determining step further comprises the steps of:

determining possible timing pairs for each of the plurality of nets in response to the slack budget factor for each of the plurality of nets and to the first required arrival time of the signal and the second required arrival time of the signal; and determining a net constraint for each of the plurality of nets, in response to the slack budget factor for each of the plurality of nets, to the gate-level design data, and to the possible timing pairs.

15. The method of claim 14, wherein the possible timing pairs for each of the plurality of nets includes a required arrival time and an arrival time.

16. A circuit formed with a timing model for a logical block in accordance with the method described in claim 10.

17. In a computer system including a memory, a method of determining a timing constraint for a logical block within a circuit, the memory having gate-level design data, including a plurality of cells and a plurality of nets for the logical block, and timing models for each of the plurality of cells, and circuit timing constraints, the method comprising the steps of:

determining a slack budget factor for each of the plurality of nets, in response to the gate-level design data and to the circuit timing constraints;

determining a net constraint for each of the plurality of nets, in response to the slack budget factor for each of the plurality of nets, to the gate-level design data and to the circuit timing constraints; and determining the timing constraint for the logical block, in response to the net constraint for each of the plurality of nets, to the timing models for the plurality of cells and to the circuit timing constraints.

18. The method of claim 17, wherein the slack budget factor for each of the plurality of nets is also determined in response to historically based length estimates for each of the plurality of nets.

19. The method of claim 17, wherein a signal has a first required arrival time and a second required arrival time at an output of the logical block, and wherein the net constraint determining step comprises the steps of:
   determining possible timing pairs for each of the plurality of nets in response to the slack budget factor for each of the plurality of nets and to the first required arrival time of the signal and the second required arrival time of the signal; and
   determining a net constraint for each of the plurality of nets, in response to the slack budget factor for each of the plurality of nets, to the gate-level design data and to the possible timing pairs.

20. A circuit formed with a timing constraint for a logical block in accordance with the method described in claim 17.

21. A computer system for determining a timing model for a logical block within a circuit, the computer system comprising:
   a memory for storing gate-level design data including a plurality of cells and plurality of nets for the logical block, and timing models for each of the plurality of cells, and circuit timing constraints;
   a slack budget factor module, coupled to the memory, for determining a slack budget factor for each of the plurality of nets, in response to the gate-level design data and to the circuit timing constraints;
   a zero slack algorithm module, coupled to the memory and the slack budget factor module, for determining a net constraint for each of the plurality of nets, in response to the slack budget factor for each of the plurality of nets, to the gate-level design data and to the circuit timing constraints; and
   a block budgeter, coupled to the memory and to the zero slack algorithm module, for determining the timing model for the logical block, in response to the timing models for the plurality of cells, to the net constraint for each of the plurality of nets and to the circuit timing constraints.

22. The computer system of claim 21, wherein the block budgeter further comprises:
   a load sensitive delay factor determining module for determining a load sensitive delay factor of one of the plurality of cells.

23. A computer system for determining a timing constraint for a logical block within a circuit, the computer system comprising:
   a memory for storing gate-level design data including a plurality of cells and plurality of nets for the logical block, and timing models for each of the plurality of cells, and circuit timing constraints;
   a slack budget factor module, coupled to the memory, for determining a slack budget factor for each of the plurality of nets, in response to the gate-level design data and to the circuit timing constraints;
   a zero slack algorithm module, coupled to the memory and the slack budget factor module, for determining a net constraint for each of the plurality of nets, in response to the slack budget factor for each of the plurality of nets, to the gate-level design data and to the circuit timing constraints; and
   a block budgeter, coupled to the memory and to the zero slack algorithm module, for determining the timing constraint for the logical block, in response to the timing models for the plurality of cells, to the net constraint for each of the plurality of nets and to the circuit timing constraints.

24. The method of claim 2,
   wherein the step of placing the first plurality of cells places the first plurality of cells in response to the block timing constraint for the first logical block; and
   wherein the step of placing the second plurality of cells places the second plurality of cells in response to the block timing constraint for the second logical block.

25. The method of claim 24, wherein the step of placing the first plurality of cells is performed independently of the step of placing the second plurality of cells.

26. A computer program product, for a computer system including a processor and a memory, for performing hierarchial timing driven layout of a circuit based upon gate-level design data and circuit timing constraints, the circuit including a plurality of cells, the computer program product comprising:
   a computer readable storage medium comprising:
      (a) code that directs the processor to partition the plurality of cells into a plurality of logical blocks, a first logical block including a first plurality of cells;
      (b) code that directs the processor to budget a block timing constraint for each of the plurality of logical blocks in response to the gate-level design data, to the circuit timing constraints, and to the partitioning of the plurality of cells into the plurality of logical blocks;
      (c) code that directs the processor to place the plurality of logical blocks within a circuit floorplan, each logical block associated with a block location within the circuit floorplan;
      (d) code that directs the processor to rebudget the block timing constraint for at least one of the plurality of logical blocks in response to the placement of the plurality of logical blocks within the circuit floorplan;
      (e) code that directs the processor to place the first plurality of cells within a block location associated with the first logical block; and
      (f) code that directs the processor to rebudget the timing constraint for at least one of the plurality of logical blocks in response to the placement of the first plurality of cells within the first logical block.

27. The computer program product of claim 26, wherein a second logical block includes a second plurality of cells, and wherein the computer readable storage medium further comprises:
   code that directs the processor to place the second plurality of cells within a block location associated with the second logical block; and
   code that directs the processor to rebudget the timing constraint for at least one of the plurality of logical blocks in response to the placement of the second plurality of cells within the second logical block.

28. The computer program product of claim 27,
   wherein the code for placing the first plurality of cells comprises code that directs the processor to place the first plurality of cells in response to the block timing constraint for the first logical block; and
   wherein the code for placing the second plurality of cells comprises code that directs the processor to place the second plurality of cells in response to the block timing constraint for the second logical block.

29. The computer program product of claim 26, wherein a second logical block includes a second plurality of cells;

wherein the code (f) includes code that directs the processor to rebudget the timing constraint for the second logical block, thereby establishing a new timing constraint for the second logical block; and wherein the computer readable storage medium further comprises:

code that directs the processor to place the second plurality of cells within a block location associated with the second logical block;

code that directs the processor to determine a predicted delay for the second logical block in response to the gate level design data; and code that directs the processor to compare the predicted delay for the second logical block to the block timing constraint for the second logical block;

code that directs the processor to rearrange the second plurality of cells within the block location associated with the second logical block in response to the new timing constraint for the second logical block, when the predicted delay for the second logical block exceeds the block timing constraint for the second logical block.

30. The computer program product of claim 26, wherein the computer readable storage medium further comprises:

code that directs the processor to determine a predicted delay for the circuit in response to the timing constraint for each of the plurality of logical blocks;

code that directs the processor to compare the predicted delay for the circuit to the circuit timing constraints; and code that directs the processor to place the plurality of logical blocks within another circuit floorplan, when the predicted delay for the circuit exceeds the circuit timing constraints.

31. The computer program product of claim 26, wherein the computer readable storage medium further comprises:

code that directs the processor to determine a predicted delay for the circuit in response to the timing constraint for each of the plurality of logical blocks;

code that directs the processor to compare the predicted delay for the circuit to the circuit timing constraints; and code that directs the processor to repartitioning the plurality of cells into another plurality of logical blocks, when the predicted delay for the circuit exceeds the circuit timing constraints.

32. A computer system for performing hierarchial timing driven layout of a circuit based upon gate-level design data and circuit timing constraints, the circuit including a plurality of cells, the system including a processor and a memory, the system comprising:

an input device, coupled to the memory for inputting the design data and circuit timing constraints;

an output device, coupled to the processor and to the memory for outputting circuit layout information; and a computer readable storage medium comprising:

(a) code that directs the processor to partition the plurality of cells into a plurality of logical blocks, a first logical block including a first plurality of cells;

(b) code that directs the processor to budget a block timing constraint for each of the plurality of logical blocks in response to the gate-level design data, to the circuit timing constraints, and to the partitioning of the plurality of cells into the plurality of logical blocks;

(c) code that directs the processor to place the plurality of logical blocks within a circuit floorplan, each logical block associated with a block location within the circuit floorplan;

(d) code that directs the processor to rebudget the block timing constraint for at least one of the plurality of logical blocks in response to the placement of the plurality of logical blocks within the circuit floorplan;

(e) code that directs the processor to place the first plurality of cells within a block location associated with the first logical block; and (f) code that directs the processor to rebudget the timing constraint for at least one of the plurality of logical blocks in response to the placement of the first plurality of cells within the first logical block.

33. The computer system of claim 32, wherein a second logical block includes a second plurality of cells;

wherein the code (f) includes code that directs the processor to rebudget the timing constraint for the second logical block, thereby establishing a new timing constraint for the second logical block; and wherein the computer readable storage medium further comprises:

code that directs the processor to place the second plurality of cells within a block location associated with the second logical block;

code that directs the processor to determine a predicted delay for the second logical block in response to the gate level design data; and code that directs the processor to compare the predicted delay for the second logical block to the block timing constraint for the second logical block;

code that directs the processor to rearrange the second plurality of cells within the block location associated with the second logical block in response to the new timing constraint for the second logical block, when the predicted delay for the second logical block exceeds the block timing constraint for the second logical block.

34. A computer program product, for a computer system including a processor and a memory, for determining a timing model for a logical block within a circuit, the memory having gate-level design data, including a plurality of cells and a plurality of nets for the logical block, and timing models for each of the plurality of cells, and circuit timing constraints, the computer program product comprising:

a computer readable storage medium comprising:

code that directs the processor to determine a slack budget factor for each of the plurality of nets, in response to the gate-level design data and the circuit timing constraints;

code that directs the processor to determine a net constraint for each of the plurality of nets, in response to the slack budget factor for each of the plurality of nets, to the gate-level design data and to the circuit timing constraints; and code that directs the processor to determine the timing model for the logical block, in response to the net constraint for each of the plurality of nets, to the timing models for the plurality of cells and to the circuit timing constraints.

35. The computer system of claim 34, the computer system for determining a timing model for a logical block within a circuit, the memory having gate-level design data, including a plurality of cells and a plurality of nets for the logical block, and timing models for each of the plurality of cells, and circuit timing constraints, the computer system further comprising:

the computer program product of claim 34;

an input device, coupled to the memory for inputting the design data and circuit timing constraints; and an output device, coupled to the processor and to the memory for outputting circuit layout information.

36. A computer program product, for a computer system including a processor and a memory, for determining a timing constraint for a logical block within a circuit, the memory having gate-level design data, including a plurality of cells and a plurality of nets for the logical block, and timing models for each of the plurality of cells, and circuit timing constraints, the computer program product comprising:

a computer readable storage medium comprising:

code that directs the processor to determine a slack budget factor for each of the plurality of nets, in response to the gate-level design data and to the circuit timing constraints;

code that directs the processor to determine a net constraint for each of the plurality of nets, in response to the slack budget factor for each of the plurality of nets, to the gate-level design data and to the circuit timing constraints; and code that directs the processor to determine the timing constraint for the logical block, in response to the net constraint for each of the plurality of nets, to the timing models for the plurality of cells and to the circuit timing constraints.

37. The computer system of claim 36, the computer system for determining a timing constraint for a logical block within a circuit, the memory having gate-level design data, including a plurality of cells and a plurality of nets for the logical block, and timing models for each of the plurality of cells, and circuit timing constraints, the computer system further comprising:

the computer program product of claim 36;

an input device, coupled to the memory for inputting the design data and circuit timing constraints; and an output device, coupled to the processor and to the memory for outputting circuit layout information.

* * * * *